J. BURKE.
DIRECT CURRENT MOTOR.
APPLICATION FILED MAR. 14, 1917.
1,365,302. Patented Jan. 11, 1921.
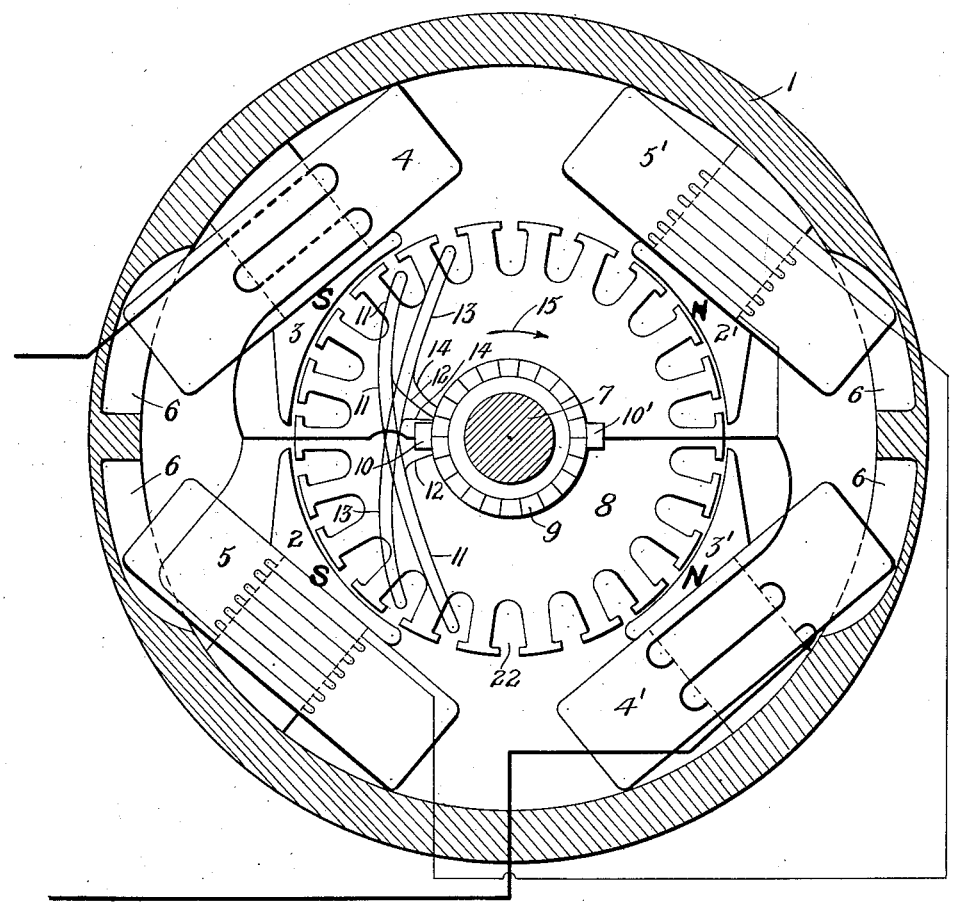
James Burke Inventor
By his Attorneys,
Edwards, Sager & Richmond.

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

DIRECT-CURRENT MOTOR.

1,365,302. Specification of Letters Patent. Patented Jan. 11, 1921.

Application filed March 14, 1917. Serial No. 154,667.

*To all whom it may concern:*

Be it known that I, JAMES BURKE, a citizen of the United States, residing at Erie, in the county of Erie and State of Pennsylvania, have invented certain new and useful Improvements in Direct-Current Motors, of which the following is a specification.

This invention relates to motors for special applications where it is desirable to avoid abnormally high or excessive speeds at no load, and where it is desirable that the speed shall be comparatively low under full load with comparatively large torque as in the case of drills and the like. I obtain this result by causing the motor to be essentially a shunt motor under no load while at full load it has the characteristics of a shunt motor coupled in series with a series motor, with a gradual change between no load and full load corresponding to the intermediate load conditions.

The main object of my invention is to produce a motor which will function as above described and secure these results in a motor of high efficiency. Another object is the production of a motor which will withstand large and abrupt changes in load and also run at full load and overloads without objectionable sparking at the brushes. Another object is the provision of a motor having the above capabilities, which will be comparatively small and light in weight. Other objects and advantages will be understood from the following description.

In carrying out the objects of my invention I divide a field pole into two parts one part having shunt windings and the other having series windings, the two parts coöperating with each other to form a pole of one polarity, the two parts being angularly displaced with reference to each other. Also each of the said shunt and series wound parts have cores widely displaced angularly so as to permit the shunt and the series windings of each angularly displaced part to have a large amount of circumferential space for the location of each winding and secure the advantage of having a comparatively short radial space occupied by the shunt and series windings. I also attain reduced diameter of the motor by recessing the frame at certain portions for reception of the field windings. I furthermore relate the series wound part to the shunt wound part so as to obtain, in addition to other advantages, that of shifting the angle of the field flux with varying load to secure good commutation. I also preferably relate the armature windings to the poles in a manner to coöperate therewith for securing the best results in commuting the current in the armature coils.

The accompanying drawing illustrates an end view of the motor, partly in section and partly diagrammatic and with certain parts omitted for clearness. The field frame and motor housing is indicated at 1. The motor is shown as having four poles, two poles each made up of two poles or parts, the two poles or parts 2, 2' being shunt wound poles and the poles or parts 3, 3' being wound with series coils. The outside dimensions of the four field coils of the motor are indicated by the rectangles 4, 4', and 5, 5', the latter being the shunt coils and the former being the series coils. The connections and windings are diagrammatically indicated by representing the series windings and series connections in heavy lines, and the shunt windings and their connections in lighter lines, the shunt field coils being indicated by a greater number of turns than the series coils.

The shunt pole 2 and the series pole 3 are shown as having extending projections or polar tips which quite closely approach each other and which are separated by a comparatively small distance. Similarly, the shunt pole 2' and the series pole 3' have extensions or pole tips which extend toward each other and are separated by a comparatively small space. The shunt and series poles 2, 3 are wound and connected to have the same polarity as each other; and the shunt and series poles 2' 3' have the same polarity as each other, but the opposite polarity from that of the poles 2, 3. The poles 2, 3 are marked as being south poles and the poles 2' 3' are marked as being north poles. Between the pole tips of opposite polarity the distance is large compared with the distance between the pole tips having like polarity.

The field frame is shown partly cut away or recessed at four different places 6 between poles of like polarity for the purpose of receiving a portion of the shunt and series coils as shown in the drawing, the axes of the field coils and of the field poles not coinciding with radii of the machine so as to cause the field coils to extend into the recesses at one side only and not extending into the field frame at the other side, as well shown in the drawings. This permits a smaller outside diameter of the motor than would be the case without the provision of these recesses for the coils, and gives the full amount of metal in the frame for passage of magnetic flux between poles of unlike polarity and also gives sufficient metal in the frame between poles of like polarity for the passage of the smaller amount of magnetic flux, as more fully explained hereinafter.

The armature shaft is shown in section at 7 and carries the armature core made up of laminæ 8. This particular armature is shown as having 22 slots. The commutator indicated at 9 is shown as having in contact therewith the two brushes 10, 10′. The armature windings are not shown complete, only two armature coils being indicated for clearness. The winding is preferably a fractional pitch winding, the pitch in this instance being 1 to 9. One armature coil 11 is shown in the short circuited position, having the two leads 12, 12 extending therefrom to the two commutator bars which are bridged by the brush 10 at this instant. Another armature coil 13 is shown located in the armature slots adjoining those in which the coil 11 is located, one lead 14 from the coil 13 being connected to the same commutator bar as a lead 12 from the coil 11, the other lead 14 from the coil 13 being connected to an adjoining commutator bar, in the usual manner. A larger number of commutator bars may be used if desired with intermediate leads from the coils connected to the commutator.

The direction of rotation of the armature with the field poles related as shown is clockwise as indicated by the arrow 15. It will be noted that the armature coil 11 while in the short circuited position shown has the upper conductors under the influence of the series pole 4 and is passing out from under its influence. Similarly other coils, when short circuited by the brush 10, will occupy the corresponding position to that in which the coil 11 is shown. Likewise, the coils which are being short-circuited by the brush 10′ will occupy a corresponding relation to the series pole 3′.

In operation, when no load is on the motor, no appreciable current passes through the series field windings, the field excitation being that created by the shunt field windings and poles 2, 2′. The motor therefore operates at a predetermined fixed speed which is much below the high or abnormal no load speeds of the series type motor. With the motor of this invention at no load, the flux from the shunt poles to the armature extends over a comparatively small surface area of the armature, and the amount of the flux then passing through the armature is preferably about one-half of that passing through the armature under full load condition. At no load the flux created by the shunt windings, in passing through the field frame 1 divides and about half of this flux passes in opposite directions through each half of the field frame from the outer end of one shunt pole to the outer end of the other. This flux is easily carried by the frame having the recessed portions 6 because there is still sufficient metal over and at the sides of the recesses to conduct this comparatively small amount of flux.

As the load on the motor increases, the excitation due to the shunt field coils remains substantially constant by reason of the substantially constant supply voltage, but the excitation due to the series field windings gradually increases. The resulting increase of total magnetic flux through the armature from the north poles 2′, 3′ to the south poles 2, 3 results in a gradual reduction in speed of the motor with correspondingly increased torque. At full load the excitation created by the series coils is preferably about equal to or stronger than that created by the shunt coils, the shunt and series windings having about the same ampere turns, or the series windings having greater ampere turns, and the flux mainly passes through the upper and lower halves of the field frame without any large amount passing through the portions of the frame which are recessed.

In addition to securing this marked increase in flux through the armature for giving reduced speed with large torque in the strong total field, the series field excitation is also in such relation to the shunt field excitation as to advance, in direction of rotation of the motor, the flux through the armature to an increasing extent as the load upon the motor increases. Consequently, this action aids in improving the commutation of the current in the armature coils with increasing load without any shifting of the brushes. Also by reason of using a fractional pitch in winding the armature, each coil when short circuited by a brush is under the influence of the series pole and emerging from such influence as above referred to, which still further aids in improving the commutation. This motor therefore operates without objectionable sparking under all load conditions and under sudden changes in load. The motor is also efficient and fully complies with the special speed and torque conditions required for certain classes of work.

Although I have described one embodiment of my invention, it will be understood that various modifications may be made therein without departing from the scope thereof.

I claim:

1. In an electric motor, the combination with the armature, of a field element having shunt wound poles and series wound poles, the tips of a shunt wound pole and a series wound pole of like polarity being separated a comparatively small distance, but those of unlike polarity being separated a comparatively large distance.

2. In an electric motor, the combination with the armature, of a field element having shunt wound poles and series wound poles, said poles being angularly displaced with relation to each other and poles of like polarity having pole tips extending toward each other on one side only of each pole, the said tips being separated a comparatively small distance.

3. In an electric motor, the combination with an armature, of a field element having shunt wound poles and series wound poles, said poles being of substantially the same size as each other and symmetrically associated in pairs with a shunt wound pole and series wound pole of like polarity in each pair, and having a separation between the pole pieces of each pair of poles less than the separation between the pole pieces of successive pairs of poles.

4. In an electric motor, the combination with the armature, of a field element having shunt wound poles and series wound poles, a series wound pole having at full load a flux at least substantially as great as a shunt wound pole, the pole pieces of all of said poles being separated, said poles being associated in pairs with a shunt wound pole and series wound pole of like polarity in each pair, and having a separation between the pole pieces of each pair of poles less than the separation between the pole pieces of successive pairs of poles.

5. In an electric motor, the combination with the armature, of a field element having shunt wound poles and series wound poles, the field coils of said poles having approximately the same shape, and the tips of a shunt wound pole and a series wound pole of like polarity being separated a small amount, but those of unlike polarity being far apart.

6. In an electric motor, the combination with the armature, of a field element having shunt wound poles and series wound poles, a series wound pole having at full load a number of ampere turns at least substantially as great as a shunt wound pole, and the pole pieces of all of said poles being separated, said poles being associated in pairs with a shunt wound pole and series wound pole of like polarity in each pair, and having a separation between the pole pieces of each pair of poles less than the separation between the pole pieces of successive pairs of poles.

7. A dynamo electric machine having a continuous inclosing field frame, and comprising poles angularly displaced, the frame being recessed between certain of the poles, and the axes of certain of the field coils passing eccentrically to the axis of the armature of the machine so as to cause said coils to extend into said recesses between certain of the poles, said poles being associated in pairs with a shunt wound pole and series wound pole of like polarity in each pair, and having a separation between the pole pieces of each pair of poles less than the separation between the pole pieces of successive pairs of poles.

8. A dynamo electric machine having a continuous inclosing field frame, and comprising poles angularly displaced, the frame being recessed between certain of the poles, and the axes of certain of the field coils and of certain of the poles passing eccentrically to the axis of the armature of the machine so as to cause said coils to extend into said recesses between certain of the poles, said poles being associated in pairs with a shunt wound pole and series wound pole of like polarity in each pair, and having a separation between the pole pieces of each pair of poles less than the separation between the pole pieces of successive pairs of poles.

9. A dynamo electric machine having a continuous inclosing field frame, and comprising shunt wound poles and series wound poles, said poles being adjacent and of like polarity and angularly displaced in relation to each other, the field frame between said poles of like polarity being recessed, and the axes of certain of the field coils passing eccentrically to the axis of the armature of the machine so as to cause said coils to extend into said recesses between poles of like polarity.

10. A dynamo electric machine having a continuous inclosing field frame, and comprising shunt wound poles and series wound poles, said poles being adjacent and of like polarity and angularly displaced in relation to each other, the field frame between said poles of like polarity being recessed, and the axes of certain of the field coils and of the poles passing eccentrically to the axis of the armature of the machine so as to cause said coils to extend into said recesses between poles of like polarity.

11. An electric motor for a constant potential circuit, comprising a field element having shunt wound poles and series wound poles, said poles being angularly displaced in relation to each other and the series wound poles being in advance of the respective coöperating shunt wound poles as regards direction of rotation of the motor, said poles being associated in pairs with a shunt wound pole and series wound pole of like polarity in each pair, and having a separation between the pole pieces of each pair of poles less than the separation between the pole pieces of successive pairs of poles.

12. An electric motor for a constant potential circuit, comprising a field element having shunt wound poles and series wound poles, said poles being angularly displaced in relation to each other and the series wound poles being in advance of the respective coöperating shunt wound poles as regards direction of rotation of the motor, and said shunt wound and series wound poles being of substantially the same size as each other, said poles being associated in pairs with a shunt wound pole and series wound pole of like polarity in each pair, and having a separation between the pole pieces of each pair of poles less than the separation between the pole pieces of successive pairs of poles.

13. An electric motor for a constant potential circuit, comprising a field element having shunt wound poles and series wound poles, said poles being angularly displaced in relation to each other and the series wound poles being in advance of the respective coöperating shunt wound poles as regards direction of rotation of the motor, a series wound pole having at full load a number of ampere turns at least substantially as great as a shunt wound pole, said poles being associated in pairs with a shunt wound pole and series wound pole of like polarity in each pair, and having a separation between the pole pieces of each pair of poles less than the separation between the pole pieces of successive pairs of poles.

14. An electric motor for a constant potential circuit, comprising a field element having shunt wound poles and series wound poles, said poles being angularly displaced in relation to each other and the series wound poles being in advance of the respective coöperating shunt wound poles as regards direction of rotation of the motor, and the pole tips of coöperating shunt wound poles and series wound poles of like polarity being separated a comparatively small distance, but those of unlike polarity being separated a comparatively large distance.

JAMES BURKE.